US010390518B2

(12) United States Patent
Yun

(10) Patent No.: US 10,390,518 B2
(45) Date of Patent: Aug. 27, 2019

(54) DOG HARNESS

(71) Applicant: Yeu Hoon Yun, Los Angeles, CA (US)

(72) Inventor: Yeu Hoon Yun, Los Angeles, CA (US)

(*) Notice: Subject to any disclaimer, the term of this patent is extended or adjusted under 35 U.S.C. 154(b) by 0 days.

(21) Appl. No.: 16/218,362

(22) Filed: Dec. 12, 2018

(65) Prior Publication Data

US 2019/0110438 A1 Apr. 18, 2019

Related U.S. Application Data

(63) Continuation-in-part of application No. 16/174,001, filed on Oct. 29, 2018, which is a continuation of application No. 15/068,626, filed on Mar. 13, 2016, now Pat. No. 10,130,076.

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC .. A01K 27/002; A01K 1/0263; A01K 27/003; A01K 27/005; A44B 11/02; A44B 11/00; A44B 11/006; A44B 11/18
USPC ....... 119/792, 863, 907, 856, 864, 770, 793, 119/857, 865, 905; 24/200, 16 R, 163 K, 24/170, 178, 308
See application file for complete search history.

(56) References Cited

U.S. PATENT DOCUMENTS

| | | | | |
|---|---|---|---|---|
| 686,129 A * | 11/1901 | Ragsdale et al. | ...... | B65D 63/08 24/26 |
| 3,377,666 A * | 4/1968 | Sherman | ................ | B65D 63/16 24/16 R |
| 3,624,868 A * | 12/1971 | Somann | ................. | A44B 11/02 24/200 |
| 4,376,366 A * | 3/1983 | Miller | ....................... | B68B 1/02 119/865 |
| 4,406,348 A * | 9/1983 | Switlik, II | ........... | B63H 9/1007 119/857 |
| 5,150,667 A * | 9/1992 | Salidrigas | ............ | A01K 27/002 119/863 |
| 5,247,905 A * | 9/1993 | Arakawa | .............. | A01K 27/002 119/863 |
| 5,329,885 A * | 7/1994 | Sporn | .................. | A01K 27/002 119/792 |
| 5,611,298 A * | 3/1997 | Sporn | .................. | A01K 27/002 119/792 |
| 5,735,023 A * | 4/1998 | Smith | .................. | A44B 11/006 24/163 K |

(Continued)

*Primary Examiner* — Yvonne R Abbott-Lewis
(74) *Attorney, Agent, or Firm* — Heedong Chae; Lucem, PC

(57) ABSTRACT

A dog harness includes a harness body, having a front potion and a rear potion, first and second front straps, first and second rear straps, first and second coupling members, first and second leash straps and a connecting means, wherein the first leash strap loops through the first coupling member such that the first leash strap is adapted to move relative to the first coupling member, wherein the second leash strap loops through the second coupling member such that the second leash strap is adapted to move relative to the second coupling member. Each of the coupling members include a ring and a rod. The coupling members are curved to lessen the amount of friction experienced by the leash straps when the leash straps loop through the coupling members.

20 Claims, 17 Drawing Sheets

(56) References Cited

U.S. PATENT DOCUMENTS

| | | | | |
|---|---|---|---|---|
| 5,915,335 | A * | 6/1999 | Holt, Jr. | A01K 1/0263 |
| | | | | 119/770 |
| 6,213,057 | B1 * | 4/2001 | Franco | A01K 27/002 |
| | | | | 119/793 |
| 7,107,939 | B2 * | 9/2006 | Lady | A01K 27/002 |
| | | | | 119/792 |
| 7,165,511 | B1 * | 1/2007 | Brezinski | A01K 27/002 |
| | | | | 119/792 |
| 7,757,641 | B1 * | 7/2010 | Worden | A01K 27/002 |
| | | | | 119/792 |
| 8,381,688 | B1 * | 2/2013 | Wejrowski | A01K 27/002 |
| | | | | 119/792 |
| 8,499,420 | B2 * | 8/2013 | Elia | A44B 11/02 |
| | | | | 24/200 |
| 8,950,364 | B1 * | 2/2015 | Wamsat | A01K 27/002 |
| | | | | 119/856 |
| 9,351,542 | B2 * | 5/2016 | Chiang | A44B 11/28 |
| 9,491,990 | B1 * | 11/2016 | Sadeck | A44B 11/00 |
| 2004/0025804 | A1 * | 2/2004 | Smith | A01K 1/0263 |
| | | | | 119/792 |
| 2008/0105216 | A1 * | 5/2008 | Sporn | A01K 27/002 |
| | | | | 119/863 |
| 2015/0164049 | A1 * | 6/2015 | Lai | A01K 27/002 |
| | | | | 119/792 |
| 2017/0265438 | A1 * | 9/2017 | Sporn | A44B 11/04 |

* cited by examiner

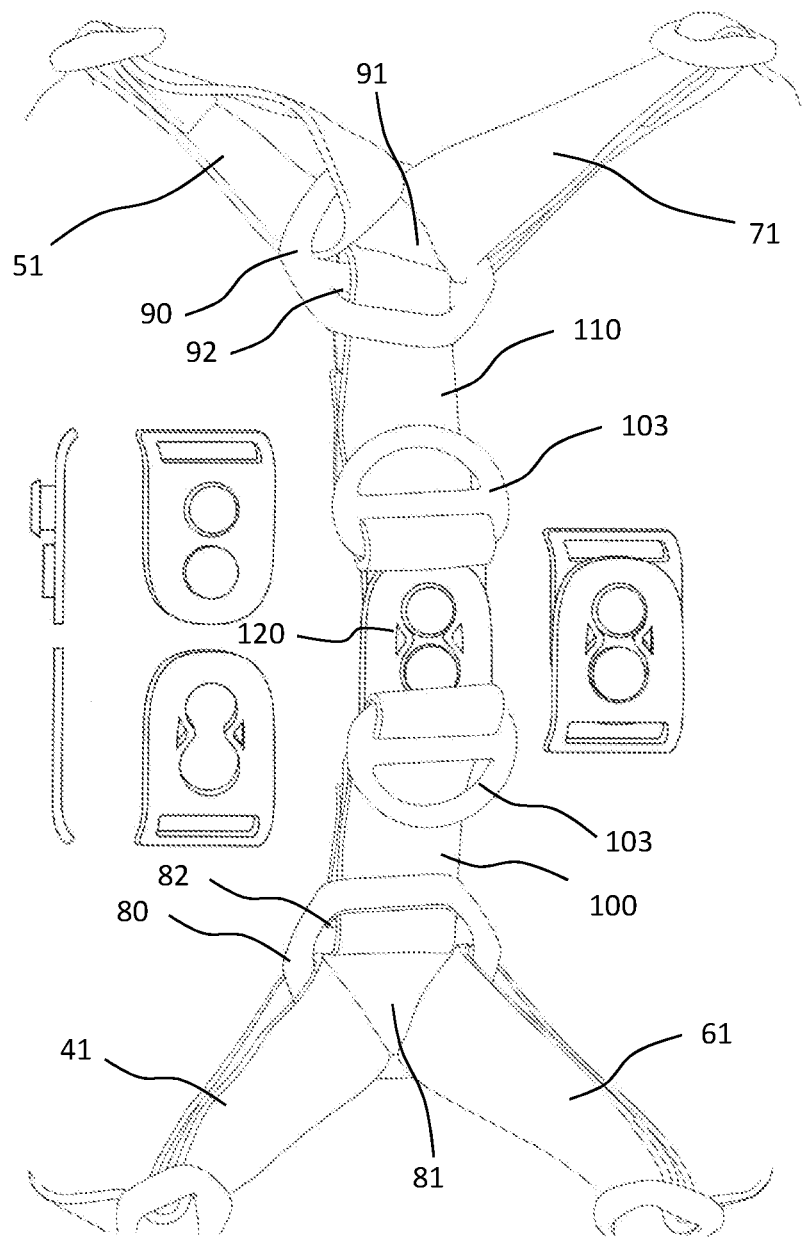

400, 500

400, 500

DOG HARNESS

CROSS-REFERENCE TO RELATED APPLICATIONS

This application is a Continuation-In-Part application of U.S. patent application Ser. No. 16/174,001, filed on Oct. 29, 2018, which is a continuation application of and claims priority to U.S. patent application Ser. No. 15/068,626, filed Mar. 13, 2016, now U.S. Pat. No. 10,130,076, issued on Nov. 20, 2018, the disclosures of which are incorporated herein in their entirety by references thereto.

FIELD OF THE INVENTION

The present invention relates to a harness for a dog, and more particularly, a dog harness having a tightening or adjusting means for preventing a dog from escaping the dog harness. The dog harness tightens when the dog tries to move forwards or backwards against the pulling force of the leash held by a dog owner, thereby preventing the dog slipping out of and escaping from the dog harness. Once the dog stops applying pressure against the pulling force of the leash held by the user, the dog harness releases back to make the dog feel comfortable.

BACKGROUND OF THE INVENTION

A dog harness is a piece of equipment for dogs, worn around a dog's torso and/or neck. The dog harness usually has a loop structure, which surrounds a dog's torso and/or neck, and a leash attachment means to be connected to a leash. The dog harness and leash are usually used together to restrain or control a dog, commonly used when walking a dog. Instead of the loop structure, a garment may be used to surround a dog's torso, including a dog's chest and/or belly.

Compared to a collar worn around a neck, a dog harness is better in preventing choking or lowering chance of slipping out of it because of its structure surrounding a dog's torso and neck and thereby distributing force. Thus, a dog harness is growing in popularity among many dog owners, especially for those having smaller breed dogs. The dog harness is also useful for controlling, directing and teaching the dog.

However, a dog harness is not free from the issue of slipping out. If a dog trying to move forward or backward against the direction of the leash held by a user, a dog harness may become loose and a dog may slip out of it and escape. Especially, when a dog tries hard to move backward against the pulling force of the leash held by a user and lower its head, there may be a room formed and getting bigger between the dog's back of neck and the leash connector connecting the leash and the dog harness, thereby allowing the dog to slip out and escape the dog harness.

Nor is a dog harness free from the issue of preventing the user from uncoupling the leash and/or removing the harness from the dog after finishing an activity together. If a dog tries to move forward or backward against the direction of the leash held by a user, the harness and/or the leash may be difficult to be released from the dog due to the difficult nature of disassociating the two elements from each other and from the dog while the dog is moving. An example may include the scenario where couplers interfacing the harness and the leash may be difficult to reach or manipulate on a moving animal.

Nor is a dog harness free from the issue of preventing undue stress to a dog. If a dog tries to move forward or backward against the direction of the leash held by a user, a dog harness may tighten in a manner that may cause undue stress to the dog. Ill fitting, poorly constructed, or poorly implemented structural elements of a dog harness may prevent straps from slackening in a proper window of time, especially if the dog is being uncooperative. For example, when the dog is moving about or being uncooperative, the pressing of the dog's body against a fastener or coupler may prevent a strap or even the leash from slackening which may lead to the harness to tighten unintentionally. This tightening of the strap can add stress to the dog.

Nor are straps of a dog harness easily adjustable by the user, especially if the dog is moving or is being uncooperative. Generally, coupling members that couple straps of a dog harness to a leash, ostensibly to allow the leash to control the dog harness, come in flat profiles. A flat profile may lead to difficulty for a user to adjust the straps by hand or through a leash when the dog harness is worn by a dog because the straps may press against the dog's torso and, at the same time, press against the coupling member while adjusting them, thus the strap experiences friction against the dog's torso and friction against the coupling member. The overall amount of friction may make strap adjustment extremely difficult, and thus, a frustrating experience for the user.

Therefore, to solve the above problems, there is a need for a dog harness to have a coupling member that provides for a freely moving leash strap that not only tightens and fastens the dog's torso but also allows slackening of the leash strap for the dog's safety when the dog tries to move backwards to escape from the dog harness. This invention is directed to solve these problems and satisfy the long-felt need.

SUMMARY OF THE INVENTION

The present invention provides a dog harness having a freely moving leash strap for tightening and fastening the dog's torso when the dog tries to move backwards to escape from the dog harness. Once the dog stops to move against a leash, the dog harness begins to be released back.

The object of the present invention is to provide a dog harness, which includes a harness body comprises an inner surface and an outer surface wherein the inner surface is contact with a torso of a dog, wherein the harness body which includes a front portion, having first and second ends of the front portion, being adapted to be positioned on the dog's torso in front of front legs of the dog; and a rear portion, having first and second ends of the rear portion, being adapted to be positioned on the dog's torso behind the front legs of the dog; a first front strap, having first and second ends of the first front strap; a second front strap, having first and second ends of the second front strap; a first rear strap, having first and second ends of the first rear strap; a second rear strap, having first and second ends of the second rear strap; a first coupling member, having first and second openings of the first coupling member, to couple the first end of the first front strap and the first end of the first rear strap; a second coupling member, having first and second openings of the second coupling member, to couple the first end of the second front strap and the first end of the second rear strap; a first leash strap, having first and second ends of the first leash strap, wherein the first end of the first leash strap is adapted to be connected to a leash; a second leash strap, having first and second ends of the second leash strap, wherein the first end of the second leash strap is adapted to be connected to the leash; and a connecting means, having first and second members, wherein the first member of the connecting means is connected to the second end of the first leash strap and the second member of the connecting means is connected to the second end of the second leash strap; wherein the first leash strap loops through the first coupling member such that the first leash strap is adapted to move relative to the first coupling member; wherein the second leash strap loops through the second coupling member such that the second leash strap is adapted to move relative to the second coupling member.

Another object of the present invention is to provide a dog harness which includes a harness body, having an inner surface and an outer surface wherein the inner surface is contact with a torso of a dog, wherein the harness body which includes a left portion, having a end of the left portion and a left loop, being adapted to be positioned on the dog's torso and surrounding around a left front leg of the dog, wherein the left loop fixedly attached the end of the left portion; and a right portion, having a end of the right portion and a right loop, being adapted to be positioned on the dog's torso and surrounding around a right front leg of the dog, wherein the right loop fixedly attached the end of the right portion; a first coupling member, having first and second openings of the first coupling member, to couple the left loop of the left portion; a second coupling member, having first and second openings of the second coupling member, to couple the right loop of the left portion; a first leash strap, having first and second ends of the first leash strap, wherein the first end of the first leash strap is adapted to be connected to a leash; a second leash strap, having first and second ends of the second leash strap, wherein the first end of the second leash strap is adapted to be connected to the leash; and a connecting means, having first and second members, wherein the first member of the connecting means is connected to the second end of the first leash strap and the second member of the connecting means is connected to the second end of the second leash strap; wherein the first leash strap loops through the first coupling member such that the first leash strap is adapted to freely move relative to the first coupling member; wherein the second leash strap loops through the second coupling member such that the second leash strap is adapted to freely move relative to the second coupling member.

Yet another object of the present invention is to provide a coupling member for use in a dog harness, wherein the dog harness comprises first and second coupling members, a main body, and a leash strap, wherein the first coupling member is coupled or attached to a first edge portion of the main body, wherein the second coupling member is coupled or attached to a second edge portion of the main body, wherein the main body is adapted to be positioned on a dog's torso, wherein the leash strap has first and second ends, wherein each of the first and second ends of the leash strap is adapted to be connected to a leash, and wherein the leash strap loops through the first coupling member and the second coupling member such that the leash strap is adapted to move though the first coupling member and the second coupling member, the coupling member comprising a ring; and a rod, wherein the ring comprises an upper portion and a lower portion, wherein the upper portion is substantially positioned on a first plane and the lower portion is substantially positioned on a second plane, wherein the rod is substantially positioned on the first plane, and wherein the first plane of the upper portion is slanted with respect to the second plane of the lower portion.

Yet another object of the present invention is to provide a dog harness comprising a main body being adapted to be positioned on the dog's torso; a first coupling member coupled or attached to a first edge portion of the main body; a second coupling member is coupled or attached to a second edge portion of the main body; and a leash strap having first and second ends; and a connecting means, having first and second members, wherein the first member of the connecting means is fixedly attached to the first end of the leash strap and wherein the second member of the connecting means is fixedly attached to the second end of the connecting means, wherein the leash strap is enclosed when the first member and the second member are coupled, wherein the connecting means contacts the dog's torso when the first member and the second member are coupled, wherein the leash strap is adapted to be connected to a leash, and wherein each of the first and second coupling members comprise a ring; and a rod, wherein the ring comprises an upper portion and a lower portion, wherein the upper portion is substantially positioned on a first plane and the lower portion is substantially positioned on a second plane, wherein the rod is substantially positioned on the first plane, and wherein the first plane of the upper portion is slanted with respect to the second plane of the lower portion.

The advantages of the present invention are: (1) the present invention provides dog harness having a tightening and releasing structure for preventing a dog from escaping the dog harness especially when the dog tries hard to move backwards to escape from the dog harness; (2) the present invention has a simple structure, but is very effective in preventing slip out; (3) the present invention makes a dog feel comfortable while wearing it; (4) the present invention is easy to manufacture and use; (5) the structure of the present invention is pleasing in appearance and functionally superior; (6) the dog harness of the present invention is convenient to adjust a dog harness to snugly fit different sizes of a dog; (7) the coupling member for the dog harness of the present invention allows the owner to adjust the dog harness without harming or adding undue stress to the dog; (8) the coupling member for the dog harness of the present invention has a simple structure; (9) the coupling member for the dog harness of the present invention is constructed to have smooth surfaces to reduce the amount of friction between itself and the dog's torso and the leash strap to allow easy adjustment of the leash strap; (10) the coupling member for the dog harness of the present invention is constructed to allow sufficient space for the leash strap to pass through even when the coupling member is against the dog's torso; (11) the coupling member for the dog harness of the present invention has an upper portion angled away from the dog's torso to reduce the amount of friction the leash strap experiences as the leash strap passes through the coupling member; and (12) the coupling member for the dog harness of the present invention is curved to allow the leash strap to pass through a significant portion the coupling member to attenuate friction from the dog's torso.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 6 shows another partial view of the dog harness of FIG. 1 with various connecting means;

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The present invention provides a dog harness having a freely moving leash strap for tightening and fastening a dog's torso when the dog tries to move backwards to escape from the dog harness against the pulling force of the leash held by a user. Once the dog stops moving backwards against the pulling force of the leash, the dog harness begins to be released back.

Figure 1:
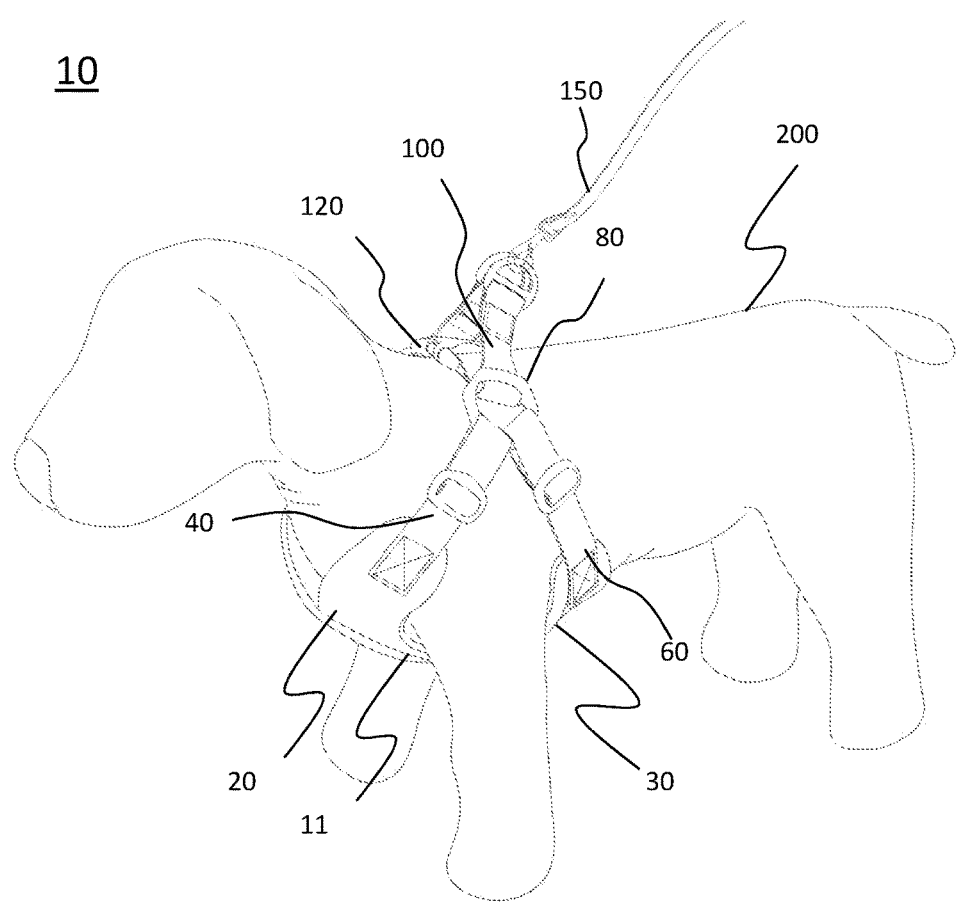
FIG. 1 shows a perspective view of a dog harness according to one embodiment of the present invention fitted to a dog.
Figure 2:
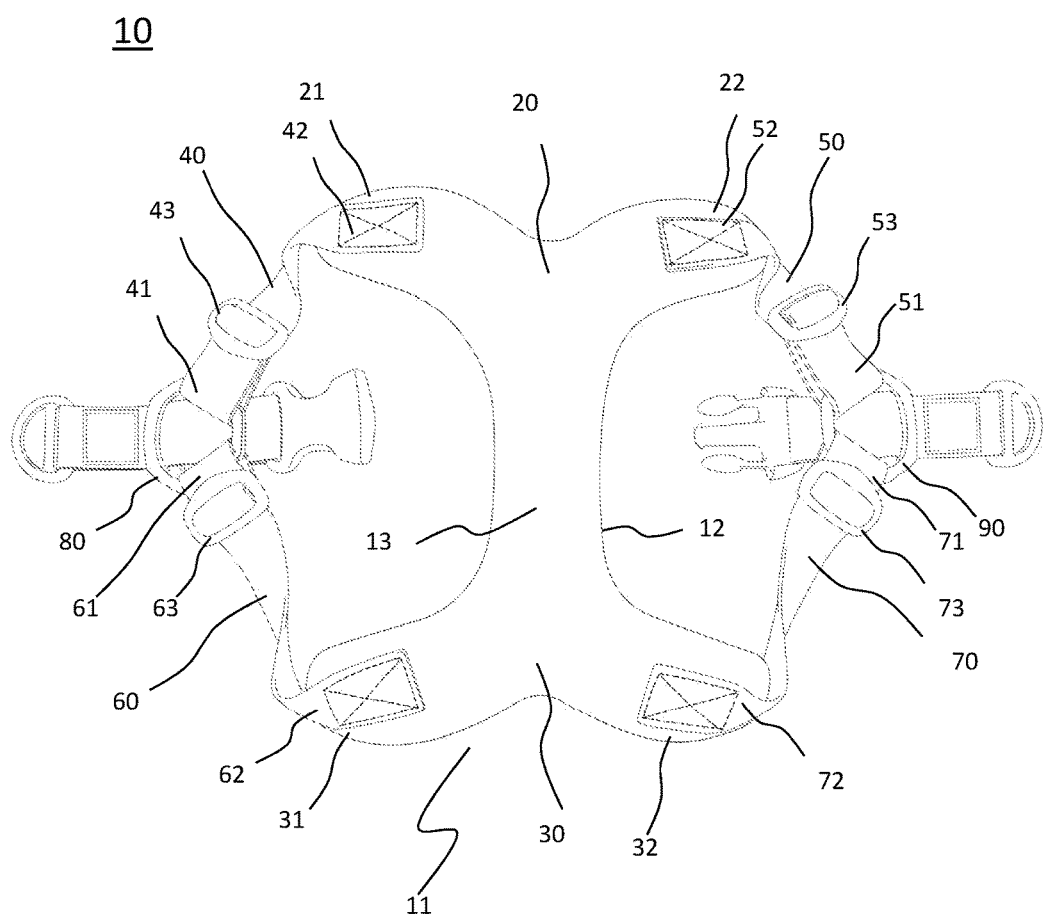
FIG. 2 shows an outer portion perspective view of a dog harness of FIG. 1.
Figure 3:
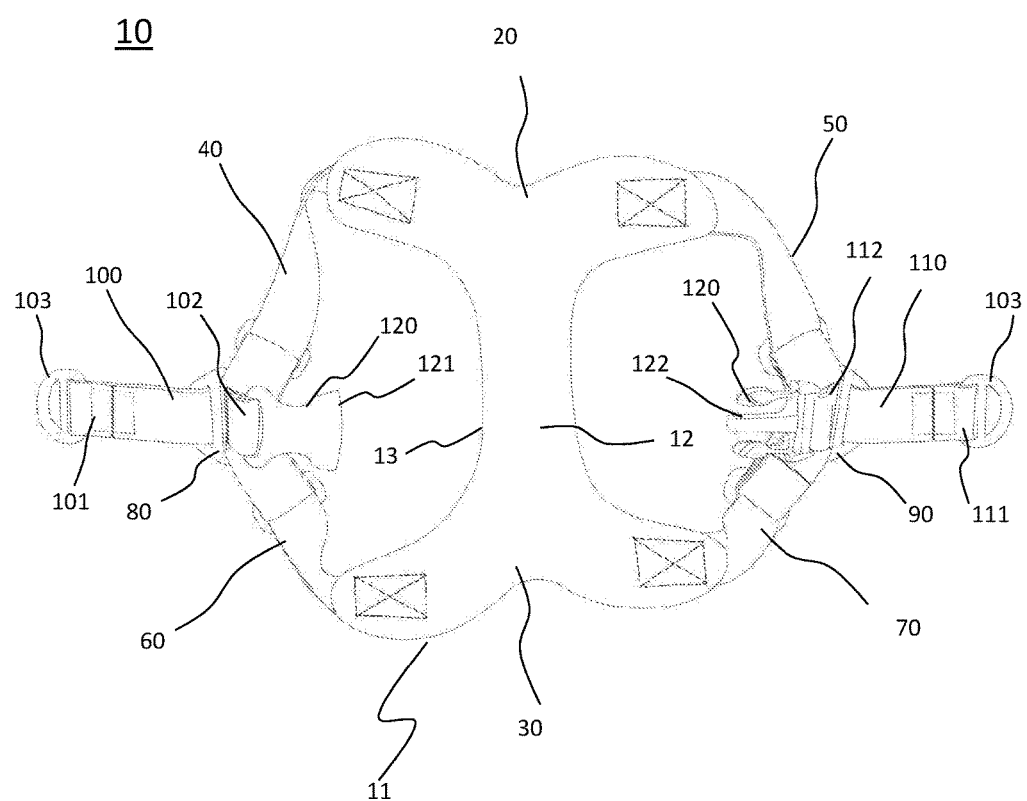
FIG. 3 shows an inner potion perspective view of the dog harness of FIG. 1.

FIG. 1 shows a perspective view of the dog harness according to one embodiment of the present invention fitted to the dog. FIG. 2 and FIG. 3 respectively show an outer potion and an inner potion of the dog harness of FIG. 1.

The dog harness 10 of the present invention may comprise a harness body 11, having an inner surface 12 and an outer surface 13 wherein the inner surface 12 may be contact with a torso of a dog 200. The harness body 10 further may comprise a front portion 20, having first and second ends 21, 22 of the front portion 20, may be adapted to be positioned on the dog's torso in front of front legs of the dog 200 and a rear portion 30, having first and second ends 31, 32 of the rear portion 30, may be adapted to be positioned on the dog's torso behind the front legs of the dog 200. A first front strap 40 may include first and second ends 41, 42 of the first front strap 40. A second front strap 50 may include first and second ends 51, 52 of the second front strap 50. A first rear strap 60 may include first and second ends 61, 62 of the first rear strap and a second rear strap 70 may include first and second ends 71, 72 of the second rear strap. A first coupling member 80 may comprise first and second openings 406, 408 of the first coupling member 80, to couple the first end 41 of the first front strap 40 and the first end 61 of the first rear strap 60. A second coupling member 90, having first and second openings 91, 92 of the second coupling member 90, may be coupled the first end 51 of the second front strap 50 and the first end 71 of the second rear strap 70.

Figure 4:
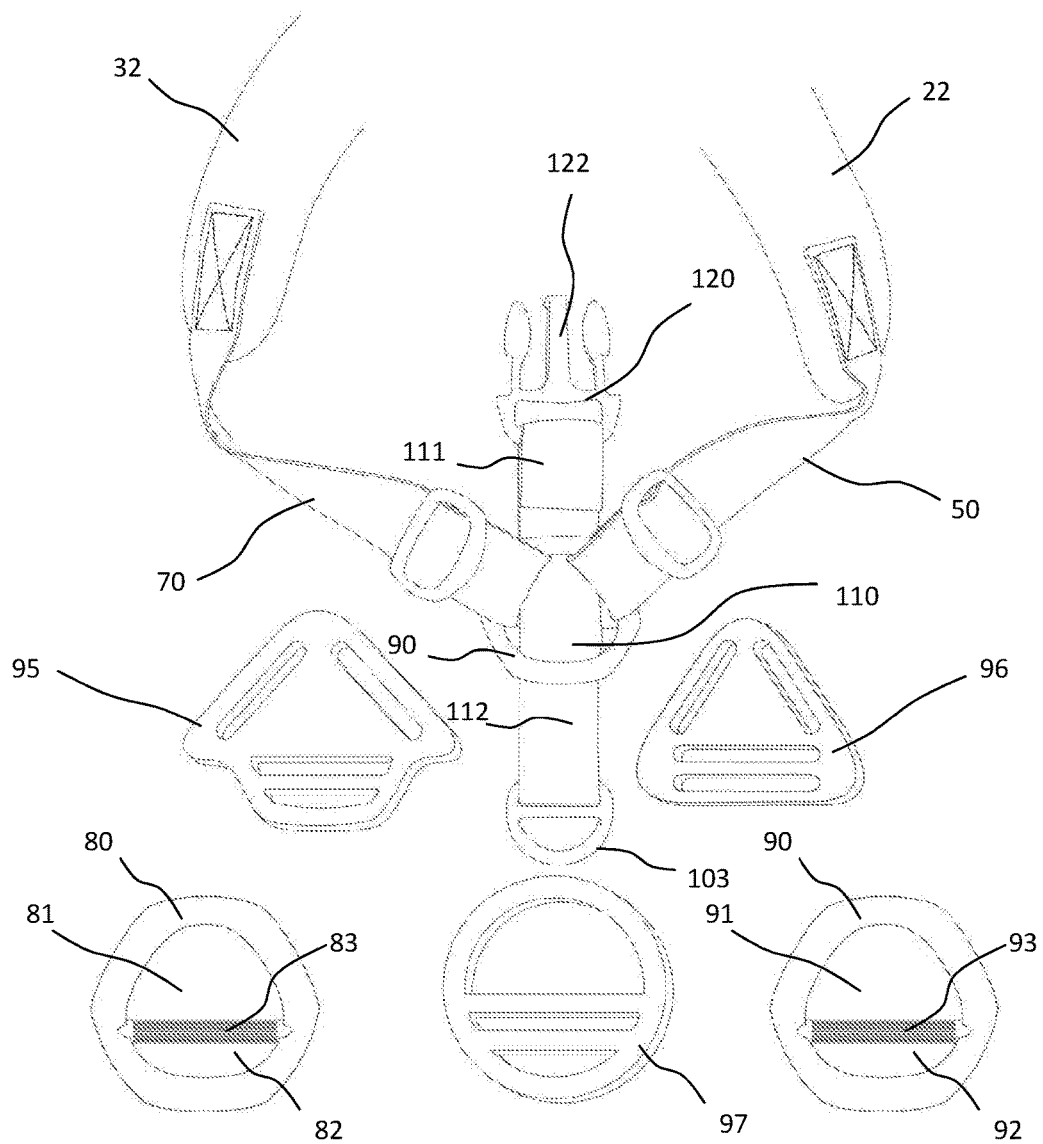
FIG. 4 shows a partial view of the dog harness of FIG. 1 with various coupling members.
Figure 5:
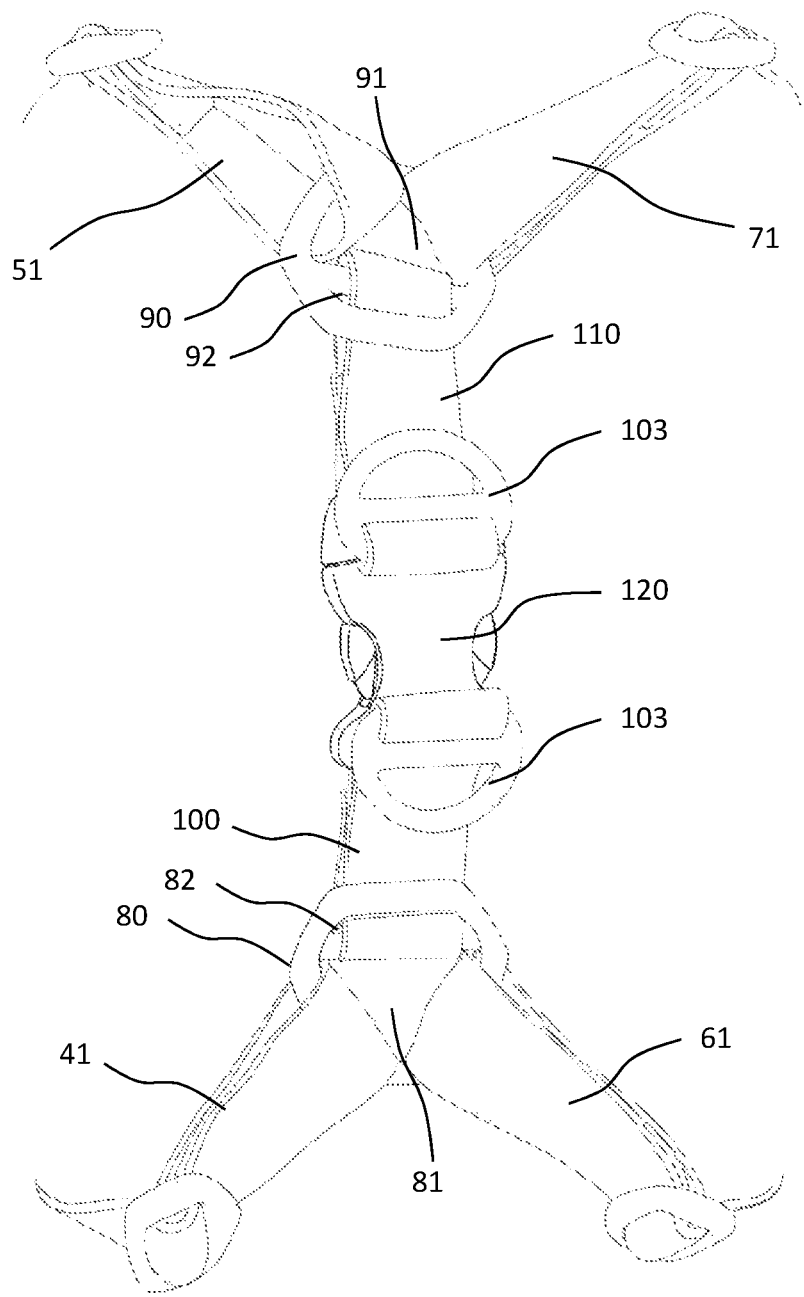
FIG. 5 shows another partial view of the dog harness of FIG. 1 when a connection means is connected with each other.

FIG. 4 shows a partial view of the dog harness of FIG. 1 with various coupling members. FIG. 5 shows another partial view of the dog harness of FIG. 1 when a connection means is connected with each other and FIG. 6 shows another partial view of the dog harness of FIG. 1 with various connecting means.

A first leash strap 100 may comprise first and second ends 101, 102 of the first leash strap 100, wherein the first end 101 of the first leash strap 100 may be adapted to be connected to a leash 150. A second leash strap 110 may include first and second ends 111, 112 of the second leash strap 110, wherein the first end 112 of the second leash strap 110 may be adapted to be connected to the leash 150. A connecting means 120 may comprise first and second members 121, 122, wherein the first member 121 of the connecting means 120 may be connected to the second end 102 of the first leash strap 100 and the second member 122 of the connecting means 120 may be connected to the second end 112 of the second leash strap 110. The first leash strap 100 may loop through the first coupling member 80 such that the first leash strap 100 may be adapted to freely move relative to the first coupling member 80 and the second leash strap 110 may loop through the second coupling member 90 such that the second leash strap 110 may be adapted to freely move relative to the second coupling member 90.

Figure 7A:
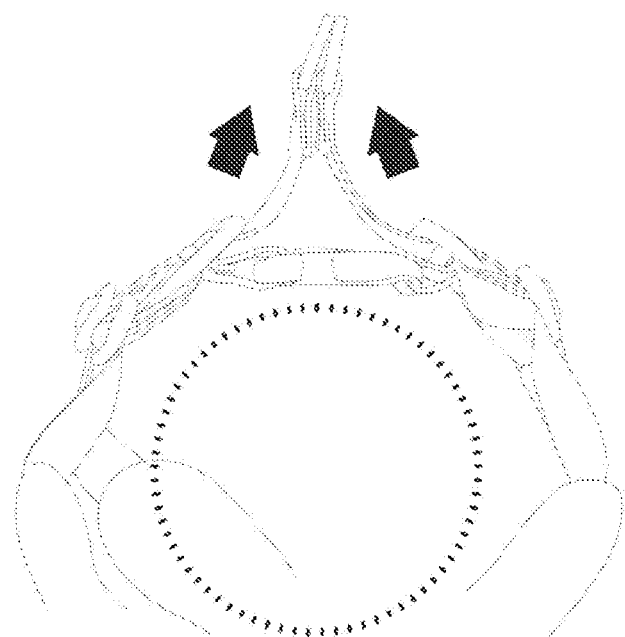
FIG. 7A shows a front perspective view of the dog harness of FIG. 1 when a leash strap is tightened.
Figure 7B:
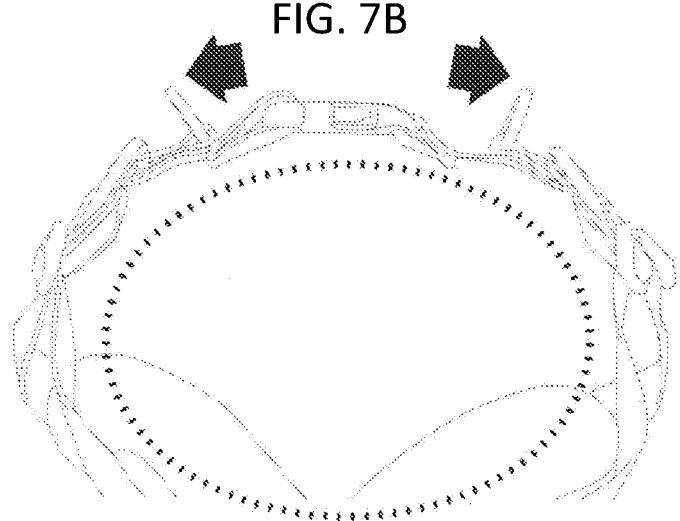
FIG. 7B shows a front perspective view of the dog harness of FIG. 1 when the leash strap loosens.

FIG. 7A shows a front perspective view of the dog harness of FIG. 1 when a leash strap is tightened and FIG. 7B shows a front perspective view of the dog harness of FIG. 1 when the leash strap loosens.

The first leash strap 100 may be adapted to freely move between a first predetermined position and a second predetermined position relative to the first coupling member 80. The second leash strap 110 may be adapted to freely move between a third predetermined position and a fourth predetermined position relative to the second coupling member 90.

Because of the structure of freely moving leash straps, the dog harness 10 of the present invention can prevent a dog from slip out or escaping the dog harness 10. Especially, when a dog tries hard to move backward against the pulling force of the leash 150 held by a user and lower its head, there may be a room formed and getting bigger between the dog's back of neck and the leash connector connecting the leash and the dog harness, thereby allowing the dog to slip out and escape the dog harness.

However, in the present invention, the dog harness is tightened or fastened when the dog tries to move backward against the pulling force of the leash. Once the dog stops moving backwards against the pulling force of the leash, the dog harness begins to be released back.

Preferably, the first leash strap 100 may pass through the first opening 406 of the first coupling member 80 and may pass back again through in the opposite direction the second opening 408 of the first coupling member 80. But, a D-ring 103 and the connecting means 120 of first and second ends 101, 102 of the first leash strap 100 cannot pass through the second opening 408 of the first opening 80. The second leash strap 110 may pass through the first opening 91 of the first coupling member 90 and may pass back again through in the opposite direction the second opening 92 of the second coupling member 90. But, a D-ring 103 and the connecting means 120 of first and second ends 111, 112 of the first leash strap 110 cannot pass through the second opening 92 of the first opening 90.

The first coupling member 80 may be a hexagon-shaped ring having openings, a triangle-shaped plate having openings or a circle-shaped ring having openings. The second coupling member 90 may be a hexagon-shaped ring having openings, a triangle-shaped plate having openings or a circle-shaped ring having openings.

The first end 101 of the first leash straps 100 and the first end 111 of the second leash straps 110 may be received respectively a D-ring 103 connected the leash 150.

The connecting means 120 may be a two-piece buckle type fasteners or a breakaway buckle. The first member 121 of the connecting means 120 may be a female buckle and the second member 122 of the connecting means 120 may be a male buckle.

The harness body 10 may be formed in substantially an I-shaped or X-shaped and the harness body 10 may be made of mesh polyester. The first and second front straps 40, 50 further may comprise respectively adjustable slides 43, 53 to adjust length of the first and second front straps 40, 50. The first and second rear straps 60, 70 further may comprise respectively adjustable slides 63, 73 to adjust length of the first and second rear straps 60, 70.

Figure 8:
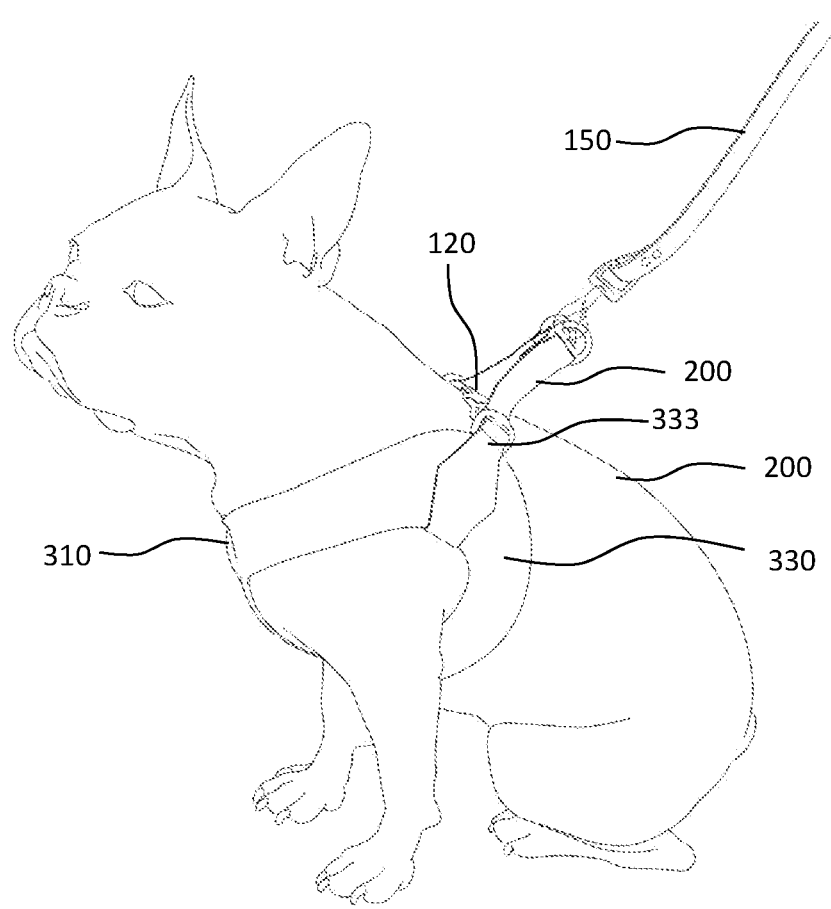
FIG. 8 shows a perspective view of the dog harness of according to another embodiment of the present invention fitted to a dog.
Figure 9:
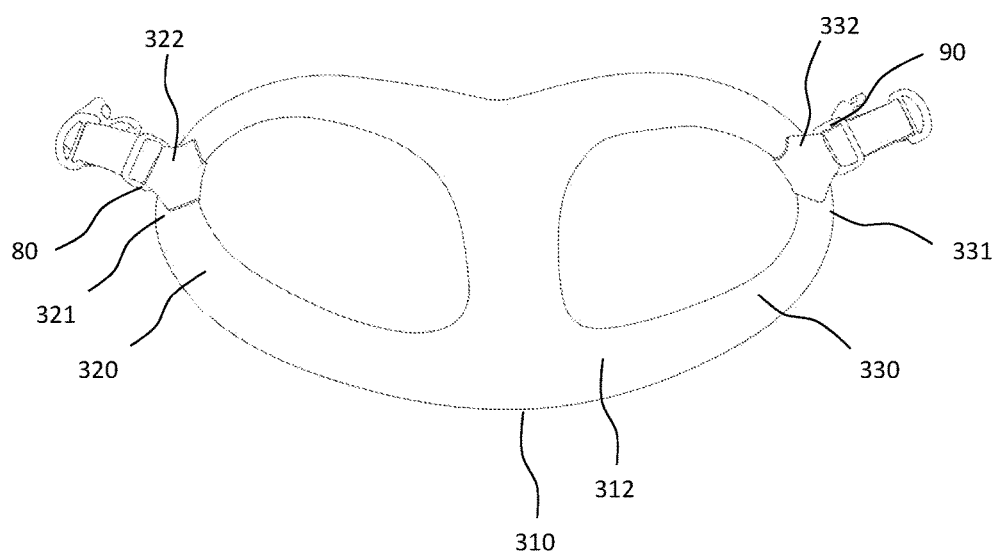
FIG. 9 shows an outer potion perspective view of a dog harness of FIG. 8.
Figure 10:
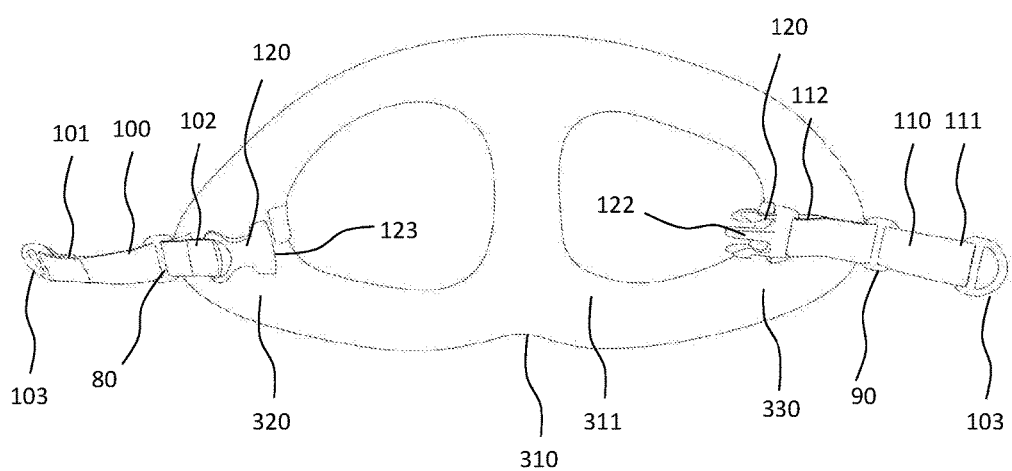
FIG. 10 shows an inner potion perspective view of the dog harness of FIG. 8.

FIG. 8 shows a perspective view of the dog harness of according to another embodiment of the present invention fitted to a dog. FIG. 9 shows an outer potion perspective view of a dog harness of FIG. 8 and FIG. 10 shows an inner potion perspective view of the dog harness of FIG. 8.

The dog harness 300 may comprise a harness body 310, having an inner surface 311 and an outer surface 312 wherein the inner surface 311 is contact with a torso of a dog 200. The harness body 310 further may comprise a left portion 320, having a end 321 of the left portion 320 and a left loop 322, may be adapted to be positioned on the dog's torso and surrounding around a left front leg of the dog 200. The left loop 322 may be fixedly attached the end 321 of the left portion 320. A right portion 330, having a end 331 of the right portion 330 and a right loop 332, may be adapted to be positioned on the dog's torso and surrounding around a right front leg of the dog 200. The right loop 332 may be fixedly attached the end 331 of the right portion.

A first coupling member 80, having first and second openings 406, 408 of the first coupling member 80, may be couple the left loop 322 of the left portion 320. A second coupling member 90, having first and second openings 91, 92 of the second coupling member 90, may be coupled the right loop 332 of the right portion 330.

A first leash strap 100 may include first and second ends 101, 102 of the first leash strap 100, wherein the first end 101 of the first leash strap 100 may be adapted to be connected to a leash 150. A second leash strap 110 may include first and second ends 111, 112 of the second leash strap 110, wherein the first end 112 of the second leash strap 110 may be adapted to be connected to the leash 150.

A connecting means 120 may comprise first and second members 121, 122 wherein the first member 121 of the connecting means 120 may be connected to the second end 102 of the first leash strap 100 and the second member 122 of the connecting means 120 may be connected to the second end 112 of the second leash strap 110 wherein the first leash strap 100 may loop through the first coupling member 80 such that the first leash strap 100 may be adapted to freely move relative to the first coupling member 80. The second leash strap 110 may loop through the second coupling member 90 such that the second leash strap 110 may be adapted to freely move relative to the second coupling member 90.

The first leash strap 100 may be adapted to freely move between a first predetermined position and a second predetermined position relative to the first coupling member 80. The second leash strap 110 may be adapted to freely move between a third predetermined position and a fourth predetermined position relative to the second coupling member 90.

The first leash strap 100 pass through the first opening 406 of the first coupling member 80 and passes back again through in the opposite direction the second opening 408 of the first coupling member 80. But, a D-ring 103 and the connecting means 120 of first and second ends 101, 102 of the first leash strap 100 cannot pass through the second opening 408 of the first opening 80. The second leash strap 110 may pass through the first opening 91 of the first coupling member 90 and may pass back again through in the opposite direction the second opening 92 of the second coupling member 90. But, a D-ring 103 and the connecting means 120 of first and second ends 111, 112 of the first leash strap 110 cannot pass through the second opening 92 of the first opening 90.

The first coupling member 80 may be a hexagon-shaped ring having openings or a triangle-shaped plate having openings or a circle-shaped ring having openings. The second coupling member 90 may be a hexagon-shaped ring having openings or a triangle-shaped plate having openings or a circle-shaped ring having openings.

The first end 101 of the first leash straps 100 and the first end 111 of the second leash straps 110 may be respectively D-rings connected the leash 150. The connecting means 120 may be a two-piece buckle type fasteners or a breakaway buckle. The first member 121 of the connecting means 120 may be a female buckle and the second member 122 of the connecting means 120 is a male buckle. The harness body 310 may be formed in substantially an 8-shaped and may be made of mesh polyester.

In the embodiment shown in FIGS. 11-14, a coupling member 400 for use in a dog harness 10, wherein the dog harness 10 comprises first coupling member 400 and second coupling member 500, a main body 11, and a leash strap 100, wherein the first coupling member 400 is coupled or attached to a first edge portion 320 of the main body 11. The second coupling member 500 is coupled or attached to a second edge portion 330 of the main body 11 where the main body 11 is adapted to be positioned on a dog's torso 200. The leash strap 100 has first and second ends 101, 102, where each of the first and second ends 101, 102 of the leash strap 100 is adapted to be connected to a leash 150. The leash strap 100 loops through the first coupling member 400 and the second coupling member 500 such that the leash strap 100 is adapted to move though the first coupling member 400 and the second coupling member 500.

As shown in FIGS. 11-14, coupling member 400 (the coupling members 400 and 500 sharing the same structure) for the dog harness 10 comprises a ring 402 and a rod 404. The ring 402 comprises an upper portion 420 and a lower portion 422, wherein the upper portion 420 is substantially positioned on a first plane 424 and the lower portion 422 is substantially positioned on a second plane 426, wherein the rod 404 is substantially positioned on the first plane 424, and wherein the first plane 424 of the upper portion 420 is slanted with respect to the second plane 426 of the lower portion 422.

As shown in FIGS. 12A-D, the upper portion 420 may be at an obtuse angle with respect to the lower portion 422 such that the upper portion 420 is constructed to be angled away from the dog's torso 200. The rod 404 may connect two points of the upper portion 420. The axis of the rod 404 may be placed above the second plane 426. As shown in FIGS. 13A-C, the axis of the rod 404 can be placed above the second plane 426 to permit sufficient space between the rod 404 and the dog's torso 200 for the leash strap 100 to pass without much difficulty for proper adjustment by the user. However, if the axis of the rod 404 is on the second plane 426, then there will be an absence of space between the rod 404 and the dog's torso 200. This absence of space between the rod 404 and the dog's torso 200 will cause difficulty in adjusting the leash strap 100, as the leash strap 100 could be caught or trapped between the rod 404 and the dog's torso 200, which may produce additional friction experienced by the leash strap 100. Therefore, the configuration where the axis of the rod 404 is placed above the second plane 426, as shown in FIGS. 13A-C, is preferred, as it provides the necessary space between the dog's torso and the rod 404 to allow freedom of movement for the leash strap 100. Further, there may be two meeting points where the upper portion 420 and the lower portion 422 meet which are curved or rounded in a side view of the coupling rings 400, 500 as shown in a cross-section of a side view in FIG. 13C.

Figure 11:
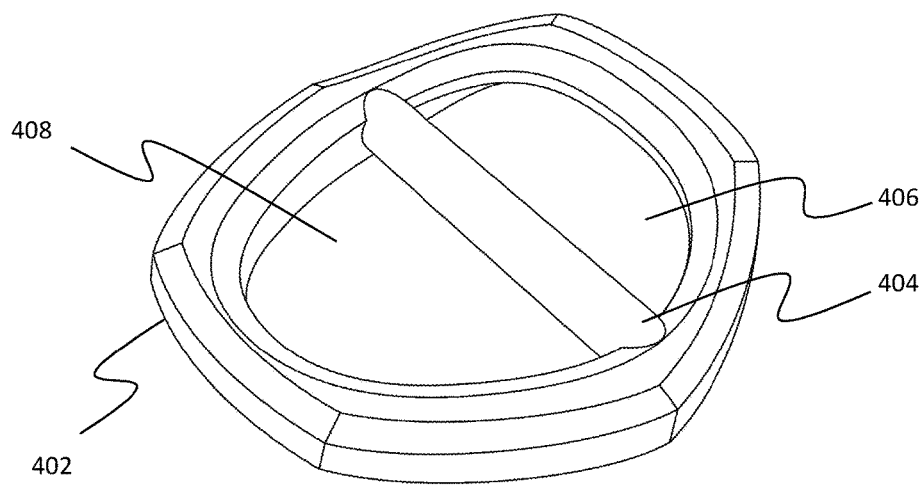
FIG. 11 shows a perspective view of the coupling member for the dog harness.
Figure 12A:
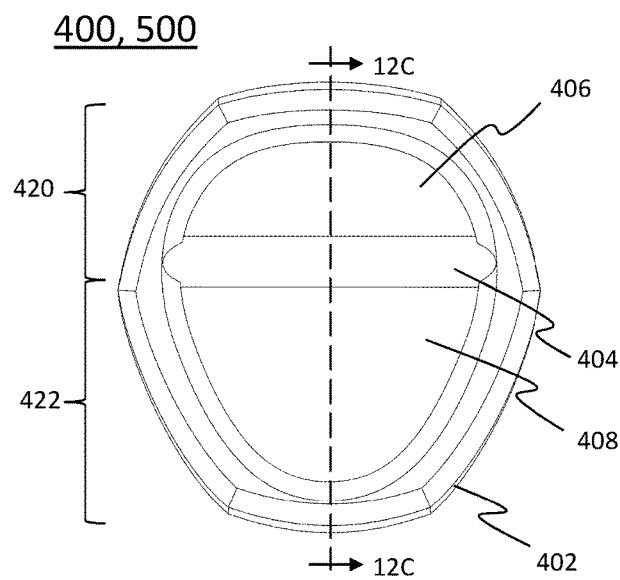
FIG. 12A shows a front elevational view of the coupling member of FIG. 11.
Figure 12B:
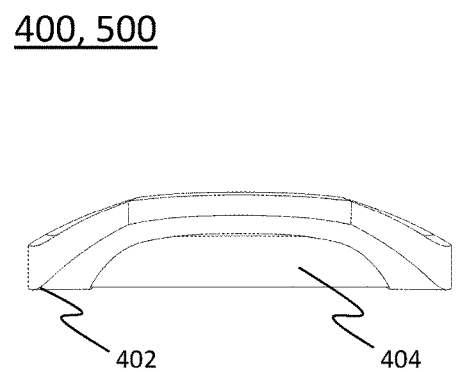
FIG. 12B shows a bottom plan view of the coupling member of FIG. 11.
Figure 12C:
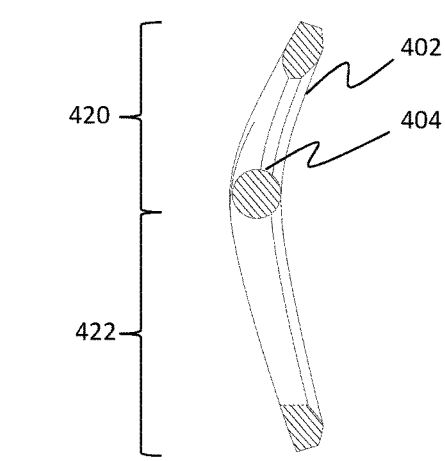
FIG. 12C shows a cross-sectional view of the coupling member of FIG. 12A.
Figure 12D:
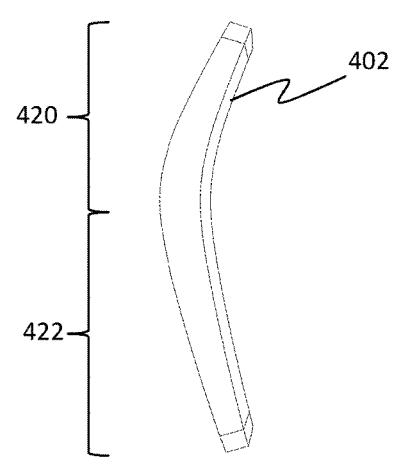
FIG. 12D shows a side elevational view of the coupling member of FIG. 11.
Figure 13A:
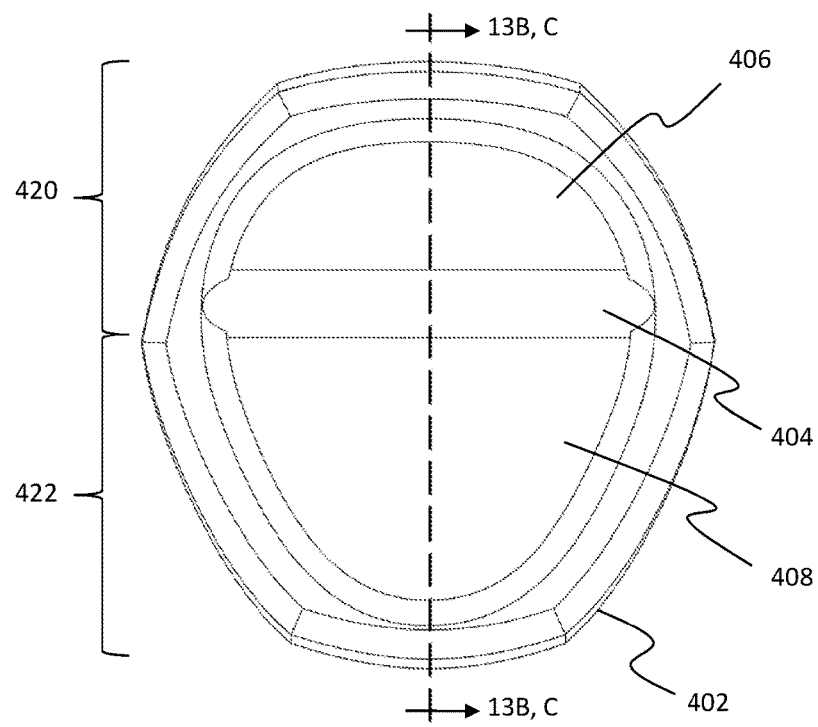
FIG. 13A shows a front elevational view of the coupling member of FIG. 11.
Figure 13B:
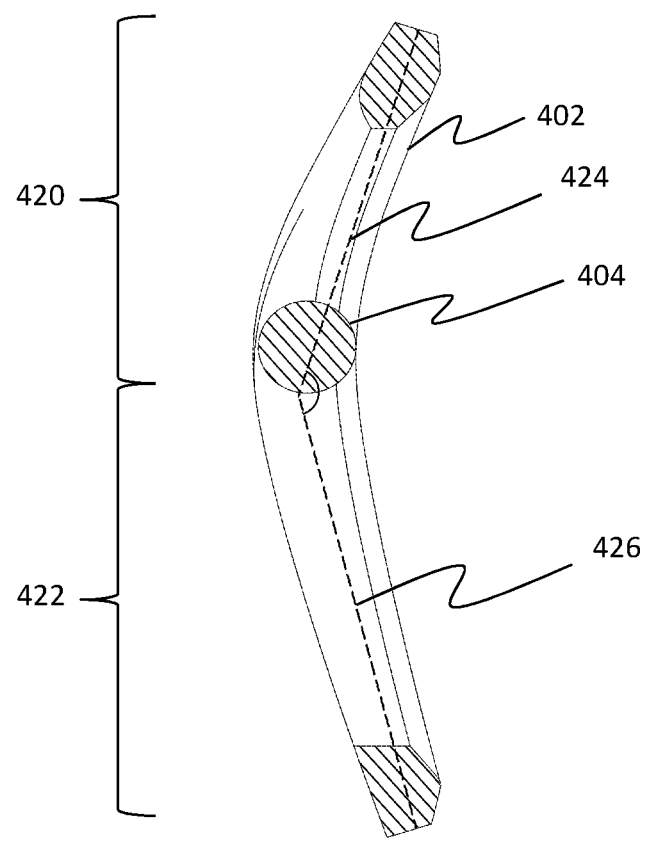
FIG. 13B shows a cross-section of the coupling member of FIG. 13A.
Figure 13C:
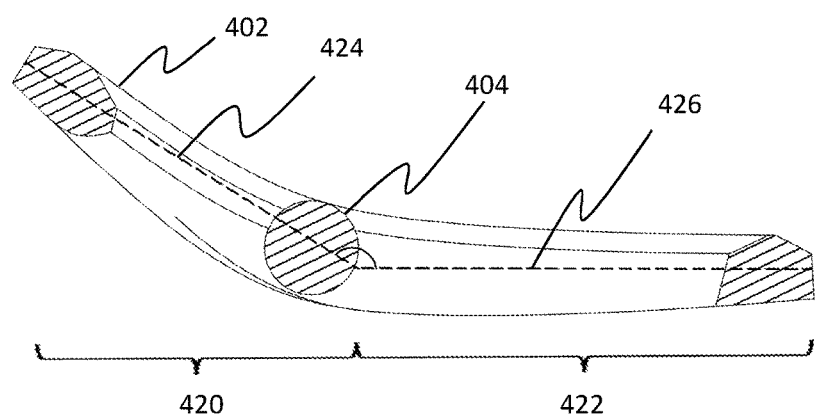
FIG. 13C shows a cross-section of the coupling member of FIG. 13A.
Figure 14A:
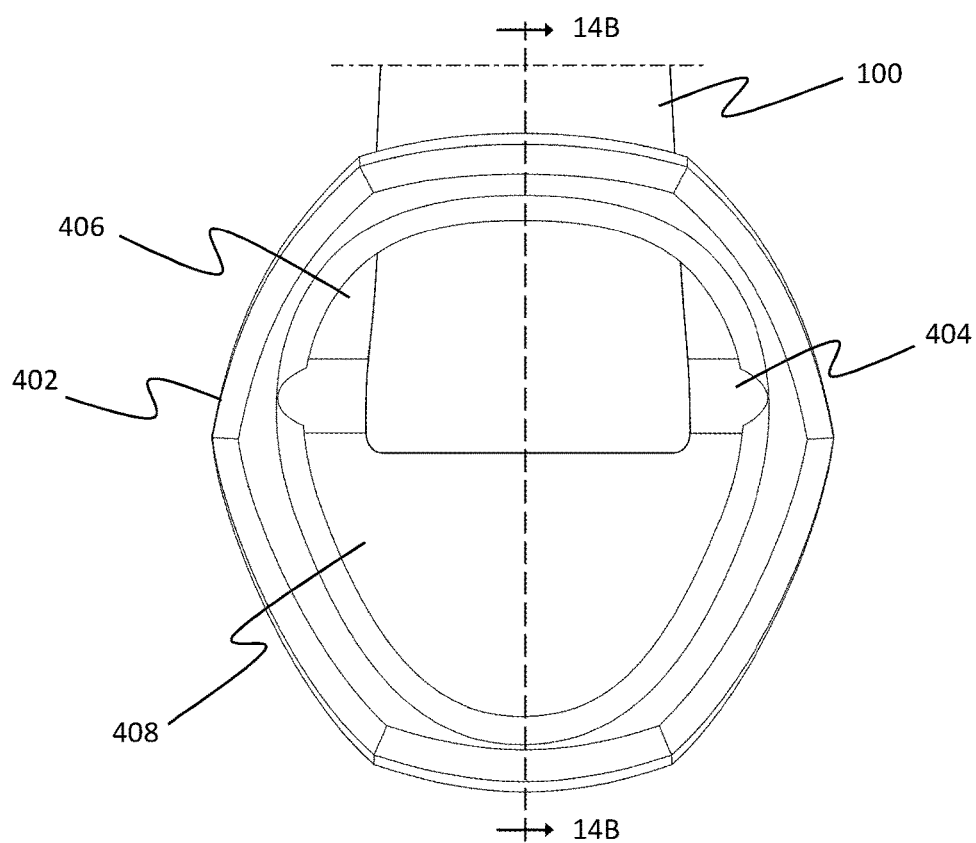
FIG. 14A shows a front elevational view of the coupling member of FIG. 11 with the leash strap of FIG. 10.
Figure 14B:
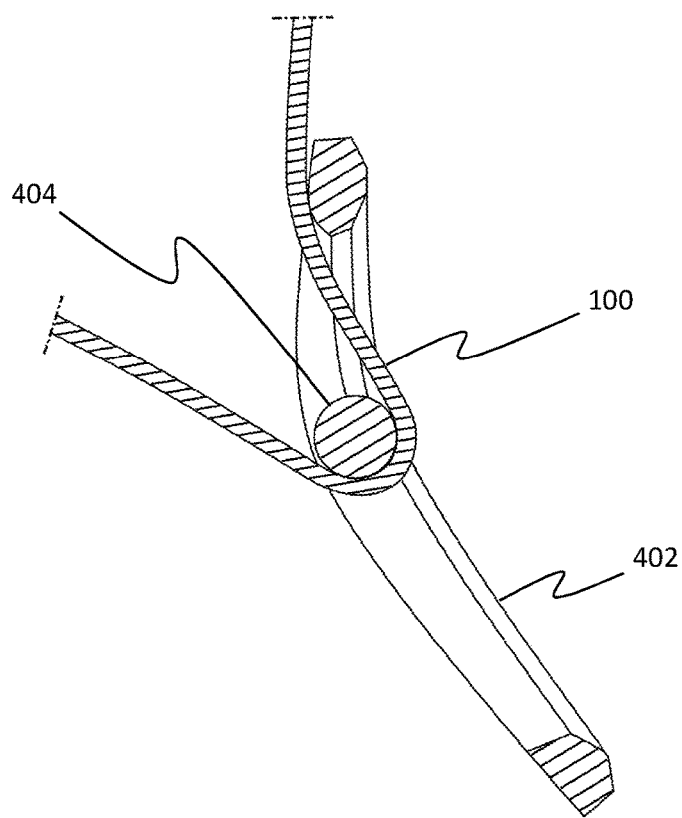
FIG. 14B shows a cross-sectional view of the coupling member of FIG. 14A with the leash strap of FIG. 14A.

As shown in FIGS. 11 and 12A, the upper portion 420 and the rod 404 may form a first opening 406, and the lower portion 422 and the rod 404 form a second opening 408, wherein the ring 402 further comprises a front surface and a rear surface wherein the front surface is opposite to a rear surface and the rear surface is constructed to face the dog's torso 200. As shown in FIGS. 14A-B, the leash strap 100 passes from the rear surface to the front surface through the second opening 408, wraps partially around the rod 404 and passes from the front surface to the rear surface through the first opening 406, contacts the rear surface of the upper portion 420, and then is connected to the leash. Additionally, the rod 404 is substantially cylindrical or substantially prismatic. When the rod 404 is substantially prismatic, the first and the other faces that make up n-sides of the rod 404 are parallelograms and the two n-sided polygonal bases are located on opposite ends of the rod 404 connecting to their respective points on the ring 402. Preferably, as shown in FIGS. 11, 12C and 13B, the rod 404 is substantially cylindrical to permit the leash strap 100 to pass by or along it easily by minimizing the amount of friction between the rod 404 and the leash strap 100. Additionally, the cross-section of the ring 402 can be substantially triangular, substantially hexagonal, substantially polygonal, substantially circular, or substantially elliptical. Preferably, as shown in FIGS. 12C and 13B, the cross-section of the ring 402 is substantially prismatic as this structure, depending on its configuration, would allow an easy passage of the leash strap 100 (smooth and/or rounded surface presented by the ring 402 to the leash strap 100) and/or a slight resistance to the slackening of the leash (an edge presented by the ring 402 to the leash strap 100).

Alternatively, the rod 404 is substantially positioned on the second plane 426. Here, two meeting points where the upper portion 420 and the lower portion 422 meet are curved or rounded, as shown in a side view of the ring 402. Additionally, the rod 404 is substantially cylindrical or substantially prismatic. When the rod 404 is substantially prismatic, the first and the other faces that make up n-sides of the rod 404 are parallelograms and the two n-sided polygonal bases are located on opposite ends of the rod 404 connecting to their respective points on the ring. Preferably, the rod 404 is substantially cylindrical to permit the leash strap 100 to pass by or along it easily by minimizing the amount of friction between the rod 404 and the leash strap 100. Additionally, the cross-section of the ring 402 can be substantially triangular, substantially hexagonal, substantially polygonal, substantially circular, or substantially elliptical. Preferably, the cross-section of the ring 402 is substantially prismatic as this structure, depending on its configuration, would allow an easy passage of the leash strap 100 (smooth and/or rounded surface presented by the ring 402 to the leash strap 100) and/or a slight resistance to the slackening of the leash (an edge presented by the ring 402 to the leash strap 100).

In an alternative embodiment, a dog harness 10 comprises a main body 11 being adapted to be positioned on the dog's torso 200; a first coupling member 400 coupled or attached to a first edge portion 320 of the main body 11; a second coupling member 500 is coupled or attached to a second edge portion 330 of the main body 11; and a leash strap 100 having first and second ends 101, 102; and a connecting means 120, having first and second members 121, 122 wherein the first member 121 of the connecting means 120 is fixedly attached to the first end of the leash strap 100 and wherein the second member 122 of the connecting means 120 is fixedly attached to the second end of the connecting means 120, wherein the leash strap 100 is enclosed when the first member and the second member are coupled, wherein the connecting means 120 contacts the dog's torso 200 when the first member and the second member are coupled, wherein the leash strap 100 is adapted to be connected to a leash.

As shown in FIGS. 11-14, each of the first and second coupling members 400, 500 (the second coupling member 500 being the same structurally as the first coupling member 400) comprises a ring 402; and a rod 404, wherein the ring 402 comprises an upper portion 420 and a lower portion 422, wherein the upper portion 420 is substantially positioned on a first plane 424 and the lower portion 422 is substantially positioned on a second plane 426, wherein the rod 404 is substantially positioned on the first plane 424, and wherein the first plane 424 of the upper portion 420 is slanted with respect to the second plane 426 of the lower portion 422.

As shown in FIGS. 13A-C, the upper portion 420 is at an obtuse angle with respect to the lower portion 422 such that the upper portion 420 is constructed to be angled away from the dog. As shown in FIGS. 11 and 12A, the rod 404 connects two points of the upper portion 420. Additionally, two meeting points where the upper portion 420 and the lower portion 422 meet are curved or rounded in a side elevational view of the ring 402 as shown in FIGS. 12C-D and 13B-C.

As shown in FIGS. 13A-C and 14A-B, the axis of the rod 404 can be placed above the second plane 426 to permit sufficient space between the rod 404 and the dog's torso 200 for the leash strap 100 to pass without much difficulty for proper adjustment by the user. However, if the axis of the rod 404 is on the second plane 426, then there will be an absence of space between the rod 404 and the dog's torso 200. This absence of space between the rod 404 and the dog's torso 200 will cause difficulty in adjusting the leash strap 100, as the leash strap 100 could be caught or trapped between the rod 404 and the dog's torso 200 resulting in the additional friction experienced by the leash strap 100. Therefore, the configuration where the axis of the rod 404 is placed above the second plane 426 is preferable as shown in FIG. 13A-C, as it provides space to allow freedom of movement for the leash strap 100 as shown in FIG. 14B.

As shown in FIGS. 11 and 12A, the upper portion 420 and the rod 404 form a first opening 406, and wherein the lower portion 422 and the rod 404 form a second opening 408, wherein the ring 402 further comprises a front surface and a rear surface wherein the front surface is opposite to a rear surface and the rear surface is constructed to face the dog's torso 200. As shown in FIG. 14B, the leash strap 100 passes from the rear surface to the front surface through the second opening 408, wraps partially around the rod 404 and passes from the front surface to the rear surface through the first opening 406, contacts the rear surface of the upper portion 420, and then is connected to the leash. The rod 404 is substantially cylindrical or substantially prismatic. When the rod 404 is substantially prismatic, the first and the other faces that make up n-sides of the rod 404 are parallelograms and the two n-sided polygonal bases are located on opposite ends of the rod 404 connecting to their respective points on the ring. Preferably, as shown in FIGS. 11, 12C and 13B, the rod 404 is substantially cylindrical to permit the leash strap 100 to pass by or along it easily by minimizing the amount of friction between the rod 404 and the leash strap 100. Further, the cross-section of the ring 402 can substantially triangular, substantially hexagonal, substantially polygonal, substantially circular, or substantially elliptical. Preferably, the cross-section of the ring 402 is substantially prismatic, as shown in FIG. 12C, because this structure, depending on its configuration, would allow easy passage of the leash strap 100 (smooth and/or rounded surface presented by the ring 402 to the leash strap 100) and/or a slight resistance to the slackening of the leash (an edge presented by the ring 402 to the leash strap 100).

Alternatively, the rod 404 is substantially positioned on the second plane 426 and the two meeting points where the upper portion 420 and the lower portion 422 meet are curved or rounded in a side elevational view of the ring 402. Here, the axis of the rod 404 is placed substantially on the second plane 426. The rod 404 can be substantially cylindrical or substantially prismatic. When the rod 404 is substantially prismatic, the first and the other faces that make up n-sides of the rod 404 are parallelograms and the two n-sided polygonal bases are located on opposite ends of the rod 404 connecting to their respective points on the ring 402. Further, the cross-section of the ring 402 can substantially triangular, substantially hexagonal, substantially polygonal, substantially circular, or substantially elliptical with the same advantages to the ring 402 as discussed above.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A coupling member for use in a dog harness, wherein the dog harness comprises first and second coupling members, a main body, and a leash strap, wherein the first coupling member is coupled or attached to a first edge portion of the main body, wherein the second coupling member is coupled or attached to a second edge portion of the main body, wherein the main body is adapted to be positioned on a dog's torso, wherein the leash strap has first and second ends, wherein each of the first and second ends of the leash strap is adapted to be connected to a leash, and wherein the leash strap loops through the first coupling member and the second coupling member such that the leash strap is adapted to move though the first coupling member and the second coupling member, the coupling member comprising:
a ring; and
a rod,
wherein the ring comprises an upper portion and a lower portion,
wherein the upper portion is substantially positioned on a first plane and the lower portion is substantially positioned on a second plane,
wherein the rod is substantially positioned on the first plane, and
wherein the first plane of the upper portion is slanted with respect to the second plane of the lower portion.

2. The coupling member of claim 1, wherein the upper portion is at an obtuse angle with respect to the lower portion such that the upper portion is constructed to be angled away from the dog.

3. The coupling member of claim 1, wherein the rod connects two points of the upper portion.

4. The coupling member of claim 3, wherein the axis of the rod is placed above the second plane.

5. The coupling member of claim 4, wherein two meeting points where the upper portion and the lower portion meet are curved or rounded in a side elevational view of the ring.

6. The coupling member of claim 3, wherein the upper portion and the rod form a first opening, and wherein the lower portion and the rod form a second opening,
wherein the ring further comprises a front surface and a rear surface wherein the front surface is opposite to a rear surface and the rear surface is constructed to face the dog's torso, and
wherein the leash strap passes from the rear surface to the front surface through the second opening, wraps partially around the rod and passes from the front surface to the rear surface through the first opening, contacts the rear surface of the upper portion, and then is connected to the leash.

7. The coupling member of claim 1, wherein the rod is substantially positioned on the second plane.

8. The coupling member of claim 7, wherein two meeting points where the upper portion and the lower portion meet are curved or rounded, as shown in a side elevational view of the ring.

9. The coupling member of claim 1, wherein the rod is substantially cylindrical or substantially prismatic.

10. The coupling member of claim 1, wherein cross-section of the ring is substantially triangular, substantially hexagonal, substantially polygonal, substantially circular, or substantially elliptical.

11. A dog harness comprising:
a main body being adapted to be positioned on the dog's torso;
a first coupling member coupled or attached to a first edge portion of the main body;
a second coupling member is coupled or attached to a second edge portion of the main body; and
a leash strap having first and second ends; and
a connecting means, having first and second members, wherein the first member of the connecting means is fixedly attached to the first end of the leash strap and wherein the second member of the connecting means is fixedly attached to the second end of the connecting means,
wherein the leash strap is enclosed when the first member and the second member are coupled,
wherein the connecting means contacts the dog's torso when the first member and the second member are coupled,
wherein the leash strap is adapted to be connected to a leash, and
wherein each of the first and second coupling members comprise:
a ring; and
a rod,
wherein the ring comprises an upper portion and a lower portion,
wherein the upper portion is substantially positioned on a first plane and the lower portion is substantially positioned on a second plane,
wherein the rod is substantially positioned on the first plane, and
wherein the first plane of the upper portion is slanted with respect to the second plane of the lower portion.

12. The dog harness of claim 11, wherein the upper portion is at an obtuse angle with respect to the lower portion such that the upper portion is constructed to be angled away from the dog.

13. The dog harness of claim 11, wherein the rod connects two points of the upper portion.

14. The dog harness of claim 13, wherein the axis of the rod is placed above the second plane.

15. The dog harness of claim 14, wherein two meeting points where the upper portion and the lower portion meet are curved or rounded in a side elevational view of the ring.

16. The dog harness of claim 13, wherein the upper portion and the rod form a first opening, and wherein the lower portion and the rod form a second opening,
wherein the ring further comprises a front surface and a rear surface wherein the front surface is opposite to a rear surface and the rear surface is constructed to face the dog's torso, and
wherein the leash strap passes from the rear surface to the front surface through the second opening, wraps partially around the rod and passes from the front surface to the rear surface through the first opening, contacts the rear surface of the upper portion, and then is connected to the leash.

17. The dog harness of claim 11, wherein the rod is substantially positioned on the second plane.

18. The dog harness of claim 17, wherein two meeting points where the upper portion and the lower portion meet are curved or rounded, as shown in a side elevational view of the ring.

19. The dog harness of claim 11, wherein the rod is substantially cylindrical or substantially prismatic.

20. The dog harness of claim 11, wherein cross-section of the ring is substantially triangular, substantially hexagonal, substantially polygonal, substantially circular, or substantially elliptical.

* * * * *